US009721028B2

United States Patent
Lee et al.

(10) Patent No.: US 9,721,028 B2
(45) Date of Patent: Aug. 1, 2017

(54) METHOD AND APPARATUS FOR PROVIDING CLOUD SERVICE

(71) Applicant: KT CORPORATION, Seongnam, Gyeonggi-do (KR)

(72) Inventors: Ki-Hoon Lee, Seongnam-si (KR); Sun-Jong Kwon, Seoul (KR); Gyu-Tae Baek, Seoul (KR)

(73) Assignee: KT Corporation, Seongnam (KR)

(*) Notice: Subject to any disclaimer, the term of this patent is extended or adjusted under 35 U.S.C. 154(b) by 237 days.

(21) Appl. No.: 13/712,542

(22) Filed: Dec. 12, 2012

(65) Prior Publication Data

US 2013/0151980 A1    Jun. 13, 2013

(30) Foreign Application Priority Data

Dec. 12, 2011 (KR) .................. 10-2011-0132744

(51) Int. Cl.
*G06F 17/30* (2006.01)

(52) U.S. Cl.
CPC .... *G06F 17/30873* (2013.01); *G06F 17/3089* (2013.01); *G06F 17/30902* (2013.01)

(58) Field of Classification Search
CPC ........... G06F 17/30873; G06F 17/3089; G06F 17/30902
USPC ....................................................... 715/738
See application file for complete search history.

(56) References Cited

U.S. PATENT DOCUMENTS

| | | | |
|---|---|---|---|
| 8,850,027 B2 * | 9/2014 | Srinivas et al. | 709/226 |
| 2007/0097130 A1 * | 5/2007 | Margulis | 345/501 |
| 2007/0216654 A1 * | 9/2007 | Arnold | G06F 17/30899 345/169 |
| 2009/0070405 A1 * | 3/2009 | Mazzaferri | 709/202 |
| 2009/0303156 A1 * | 12/2009 | Ghosh et al. | 345/1.2 |
| 2010/0011012 A1 * | 1/2010 | Rawson | H04L 67/30 707/E17.009 |
| 2011/0078532 A1 * | 3/2011 | Vonog et al. | 714/752 |
| 2011/0138069 A1 * | 6/2011 | Momchilov et al. | 709/231 |
| 2011/0209064 A1 * | 8/2011 | Jorgensen | G06F 9/4445 715/733 |
| 2012/0076197 A1 * | 3/2012 | Byford et al. | 375/240.01 |
| 2012/0150992 A1 * | 6/2012 | Mays et al. | 709/217 |
| 2012/0173755 A1 * | 7/2012 | Margulis | 709/231 |
| 2012/0294541 A1 * | 11/2012 | Hsieh et al. | 382/233 |
| 2012/0311457 A1 * | 12/2012 | O'Gorman | 715/740 |

FOREIGN PATENT DOCUMENTS

| | | |
|---|---|---|
| JP | 2007310508 A | 11/2007 |
| KR | 20040065833 A | 7/2004 |
| KR | 10-2011-0049507 A | 5/2011 |
| KR | 10-2011-0092143 A | 8/2011 |

* cited by examiner

*Primary Examiner* — Jennifer To
*Assistant Examiner* — John Repsher, III
(74) *Attorney, Agent, or Firm* — Sughrue Mion, PLLC

(57) ABSTRACT

A method performed by a cloud service providing apparatus includes receiving a request for execution of an application from a user device, executing the application in response to the request, encoding application execution data generated by the execution of the application into image data and transmitting the encoded image data to the user device, wherein the encoded image data is configured to be displayed on a screen of the user device.

14 Claims, 5 Drawing Sheets

METHOD AND APPARATUS FOR PROVIDING CLOUD SERVICE

CROSS-REFERENCE TO RELATED APPLICATION

This application claims priority from the Korean Patent Application No. 10-2011-0132744, filed on Dec. 12, 2011 in the Korean Intellectual Property Office, the entire disclosure of which is incorporated herein by reference.

BACKGROUND

1. Field

Exemplary embodiments broadly relate to a method and an apparatus for providing a cloud service, and more specifically, a method and an apparatus for providing a user device with an application executed based on cloud computing.

2. Description of the Related Art

With the recent development of technologies, various devices have been propagated, and at the same time, the types of applications executed in one device have been diversified. However, as the speed of development of service quality overtakes the speed of development of device technology, the device performance does not keep pace with the service quality.

Further, as types and data volume of applications have increased, it is becoming increasingly difficult for a user to download all applications in his/her device and utilize the applications.

Thus, increasing attention is being paid to the service, by which execution of an application is performed by cloud computing server, and a device only receives a result of the execution of the application.

Korean Patent Application Publication No. 2011-0049507 describes that a device directly executes an application or a remote server executes the application based on execution time, power consumption, and other factors related to the execution of the application, and the device receives an execution result. Korean Patent Application Publication No. 2011-0092143 describes receiving, from a device, a request for execution of an application and a request for designation of an interested area based on an execution result, executing the requested application, transmitting the execution result via data stream, and adjusting transmission quality for the area designated as the interested area.

SUMMARY

Accordingly, it is an aspect to provide an application executing method and apparatus, by which execution of an application is performed by a cloud service providing server, and not a user device, and the user device only receives and displays encoded image data as a result of the execution.

According to an aspect of exemplary embodiments, there is provided a method performed by a service providing apparatus. The method includes receiving a request for execution of an application from a device, executing the application in response to the request, encoding application execution data generated by the execution of the application into image data and transmitting encoded image data to the device, wherein the encoded image data is configured to be displayed on a screen of the device.

The encoding the application execution data may comprise: determining whether or not video data is included in the application execution data to generate a determination result; selecting target data based on the determination result; and encoding the target data into the image data.

The selecting the target data may comprise: if the determination result indicates that the video data is included in the application execution data, determining whether or not the video data is reproducible by the device.

If the video data is reproducible by the device, the target data may be selected such that the video data is not included in the target data.

The service performed by the service providing apparatus may further comprise transmitting the video data and position information of the video data that is to be reproduced on the screen of the user device.

The method may further comprise: receiving a request for a user interface from the device; generating user interface data that is available to the device; encoding the generated user interface data into user interface image data; and transmitting the encoded user interface image data to the device.

The encoded user interface image data may be configured to be displayed on a screen of the device. The encoded user interface image data may include at least one icon showing at least one application that is available to the device.

The image data may be generated based on a hardware specification of the device.

According to another aspect of exemplary embodiments, a service providing apparatus includes a request receiver configured to receive a request for execution of an application from a device, an application executor configured to execute the application in response to the request for execution of the application to generate application execution data, an encoding processor configured to encode the generated application execution data into image data and a data transmitter configured to transmit encoded image data to the device, wherein the encoded image data is configured to be displayed on a screen of the device.

The image data may comprise encoded target data excluding video data.

The apparatus may further comprise: a user interface processor configured to generate user interface data that is available to the device if the request receiver receives a request for a user interface from the device, and to encode the generated user interface data into user interface image data, wherein the data transmitter is configured to transmit the encoded user interface image data to the device.

The service providing apparatus may provide a cloud service.

The operation of executing the application may be performed by the service providing apparatus, not the device.

The operation of receiving a request for execution of the application may comprise: receiving, by the device, an input of a user based on a point on the screen being selected by the user and receiving, by the service providing apparatus, a coordinate corresponding to the selected point.

The hardware specification of the device may comprise at least one from among processing speed, resolution, and screen size.

Also, the operation of executing the application may comprise generating a virtual machine and the generated virtual machine performing the execution of the application.

In exemplary embodiments, the cloud service providing server executes an application, and generates image data including a result of the execution to provide the image data to the user device. The user device displays the received image data so as to output the application execution result. Accordingly, a user using a low-end device can use a high-performance application. Further, a user can use his/her desired application without downloading all various applications in his/her device.

BRIEF DESCRIPTION OF THE DRAWINGS

Non-limiting and non-exhaustive exemplary embodiments will be described in conjunction with the accompanying drawings. Understanding that these drawings depict only exemplary embodiments and are, therefore, not to be intended to limit its scope, the exemplary embodiments will be described with specificity and detail taken in conjunction with the accompanying drawings, in which.

DETAILED DESCRIPTION OF EXEMPLARY EMBODIMENTS

Figure 1:
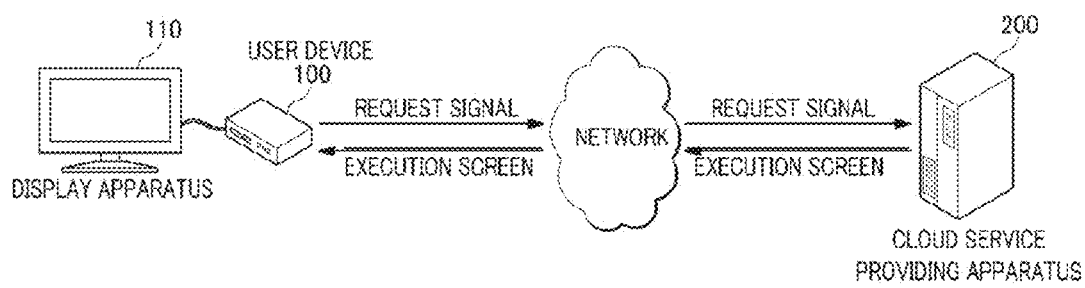
FIG. 1 is a view illustrating a cloud service providing system according to an exemplary embodiment.

Hereinafter, exemplary embodiments will be described in detail with reference to the accompanying drawings and can be readily implemented by those skilled in the art. However, it is to be noted that the present disclosure is not limited to the exemplary embodiments, but can be realized in various other ways. In the drawings, certain parts not directly relevant to the description of exemplary embodiments are omitted to enhance the clarity of the drawings, and like reference numerals denote like parts throughout the whole document.

Throughout the whole document, the terms "connected to" or "coupled to" are used to designate a connection or coupling of one element to another element, and include both a case where an element is "directly connected or coupled to" another element and a case where an element is "electronically connected or coupled to" another element via still another element. Further, each of the terms "comprises," "includes," "comprising," and "including," as used in the present disclosure, is defined such that one or more other components, steps, operations, and/or the existence or addition of elements are not excluded in addition to the described components, steps, operations and/or elements.

Hereinafter, exemplary embodiments will be explained in detail with reference to the accompanying drawings.

FIG. 1 is a view illustrating a cloud service providing system according to an exemplary embodiment.

According to an exemplary embodiment, a user device 100 may include devices supporting wired communication such as a set top box and a smart TV, and furthermore, devices supporting radio communication such as a tablet PC and a smart phone.

The user device 100 transmits a signal for requesting a cloud service to a cloud service providing server 200 through a network. The user device 100 may request the cloud service providing server 200 to execute an application, and furthermore, to provide a pre-set user interface for the user device 100.

In response to the request from the user device 100, the cloud service providing server 200 provides the user device 100 with the cloud service requested by the user device 100. That is, if the user device 100 requests an application service, the cloud service providing server 200 may execute the requested application, and make application execution data as a result of the execution of the application, and encode the generated application execution data into image data to provide the image data to the user device 100.

That is, the cloud service providing server 200, and not the user device 100, executes an application. The user device 100 receives the result of the execution and the encoding of the application in a video streaming form or the like, and displays the result to provide the result to the user.

If input of the user occurs, e.g., if the user selects a certain point on a screen, the user device 100 may transmit information such as a coordinate of the selected point to the cloud service providing server 200. In response to the information received from the user device 100, the cloud service providing server 200 may recognize that an area corresponding to the coordinate of the selected point has been selected, and accordingly, execute corresponding operation of an application.

For example, if the cloud service providing server 200 executes an application indicating a web page, and provides the user device 100 with an execution screen, when the user selects a certain link included in the web page, the user device 100 may transmit a selecting signal including information about the selected link point to the cloud service providing server 200.

The cloud service providing server 200 recognizes the selecting signal received from the user device 100, and executes an application to perform the operation for the selected link. The cloud service providing server 200 may convert the execution screen of the application into image data, and transmit the image data to the user device 100 in a streaming manner.

The cloud service providing server 200 may encode the execution screen of the application to be suitable for information of the user device 100, e.g., a hardware specification, such as a processing speed, resolution, a screen size, and other aspects of the user device 100, and transmit the encoded screen to the user device 100.

If the execution screen of the application includes reproduction of a video, e.g., if a web page includes a video, and an execution screen of the web page needs to be processed into images and transmitted to the user device in a streaming manner, the cloud service providing server 200 should transmit tens or hundreds of images per second to the user device 100. In this case, the cloud service providing server 200 may require a large amount of resources.

The cloud service providing server 200 may separately transmit the corresponding video data to the user device depending on whether or not the user device 100 decodes the corresponding video data. The user device 100 may reproduce the received corresponding video data such that the video data can be incorporated into the image data for the execution screen of the application provided by the cloud service providing server 200.

That is, the cloud service providing server 200 may make image data for only the remaining areas other than the area where the corresponding video is placed, to transmit the image data to the user device 100. The user device 100 may decode the video data and display the video data to a screen, together with the image data received from the cloud service providing server 200.

Figure 2:
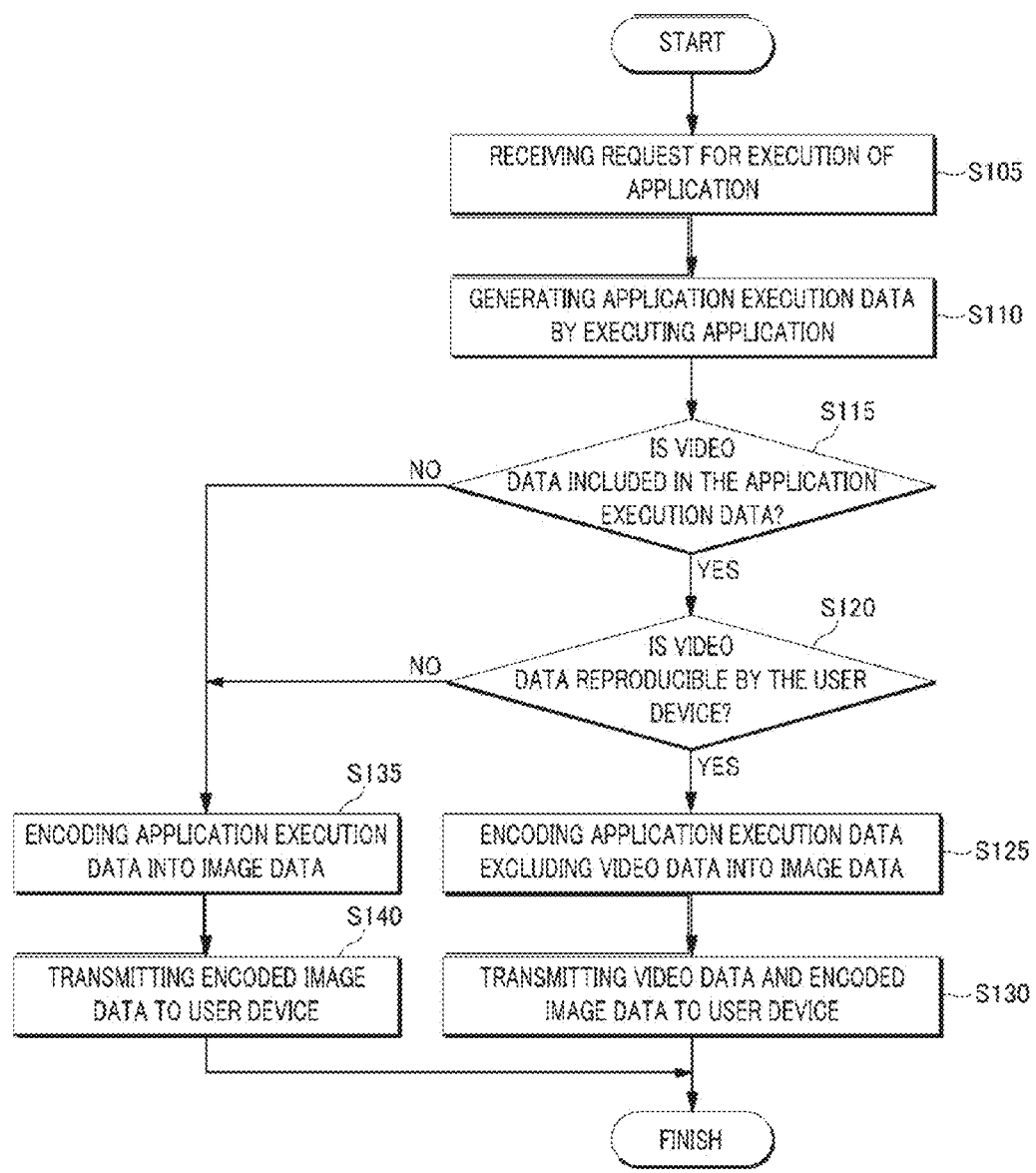
FIG. 2 is a flow diagram illustrating a cloud service providing method according to an exemplary embodiment.

FIG. 2 is a flow diagram illustrating a cloud service providing method according to an exemplary embodiment.

In operation S105, the cloud service providing server 200 receives a request for execution of application from the user device 100. The cloud service providing server 200 may receive information of the user device 100 and information of the requested application from the user device 100.

In operation S110, the cloud service providing server 200 executes the application requested in operation S105. The cloud service providing server 200 may generate a virtual machine for execution of the application to execute the requested application. The cloud service providing server 200 generates application execution data by executing the application In operation S115, the cloud service providing server 200 determines whether video data is included in the application execution data generated in operation S110.

As described above, if an application indicating a web page is executed, a video included in the web page is also executed, such that data of the video may be included in the execution screen of the application.

If the video data is included and reproduced in the execution screen of the application as described above, the number of image data to be transmitted to the user device 100 rapidly increases due to the video data being reproduced. In order to convert the video with tens or hundreds of frame images being changed per second into image data, and provide the changed image data to the user device 100, tens or hundreds of image data should be generated per second, and the generated image data should be transmitted to the user device 100.

In order to encode the video data included in the execution screen of the application and compress and transmit image data of the encoded screen, the cloud service providing server 200 requires a lot of resources.

Accordingly, the cloud service providing server 200 determines whether the video data is included in the application execution data, as described above.

In operation S120, if the video data is included in the application execution data generated in operation S110, the cloud service providing server 200 determines whether the video data is reproducible by the user device 100 that has requested the execution for the application in operation S105.

That is, the cloud service providing server 200 may determine whether the user device 100 that has requested the execution for the application in operation S105 can decode and reproduce the video included in the execution screen of the application.

The user device 100 may not decode or reproduce the video included in the execution screen of the application depending on a hardware specification, such as a codec, a CPU performance, and a resolution, etc. of the user device 100. Accordingly, the cloud service providing server 200 determines whether the user device 100 can reproduce the video included in the execution screen of the application.

In operation S125, if it is determined that the video data is reproducible by the user device 100, the cloud service providing server 200 encodes the remaining areas, other than the area where the video data is included, in the execution screen of the application into image data.

The cloud service providing server 200 acquires position information of the area where the video data is included, within the screen.

Accordingly, less resource may be required when the cloud service providing server 200 encodes the application execution data into image data, compared to the resource required when the cloud service providing server 200 encodes the application execution data and the video data into image data.

In operation S130, the cloud service providing server 200 transmits, to the user device, the image data encoded in operation S125, the position information of the area where the video is reproduced within the screen, and the video data included in the execution screen of the application.

The user device 100 displays the image data including the execution screen of the application, and the video data together that have been received from the cloud service providing server 200, by using the position information of the video data, so as to provide the user with the screen, in which the application is executed.

In operation S135, if it is determined that the video data is not included in the application execution data or the video data is not reproducible by the user device 100 when the video data is included in the application execution data, the cloud service providing server 200 encodes the execution screen of the application into image data.

In operation S140, the cloud service providing server 200 transmits the image data encoded in operation S135 to the user device. The user device may provide the user with the screen, in which the application is executed, by using the image data received from the cloud service providing server 200.

Figure 3:
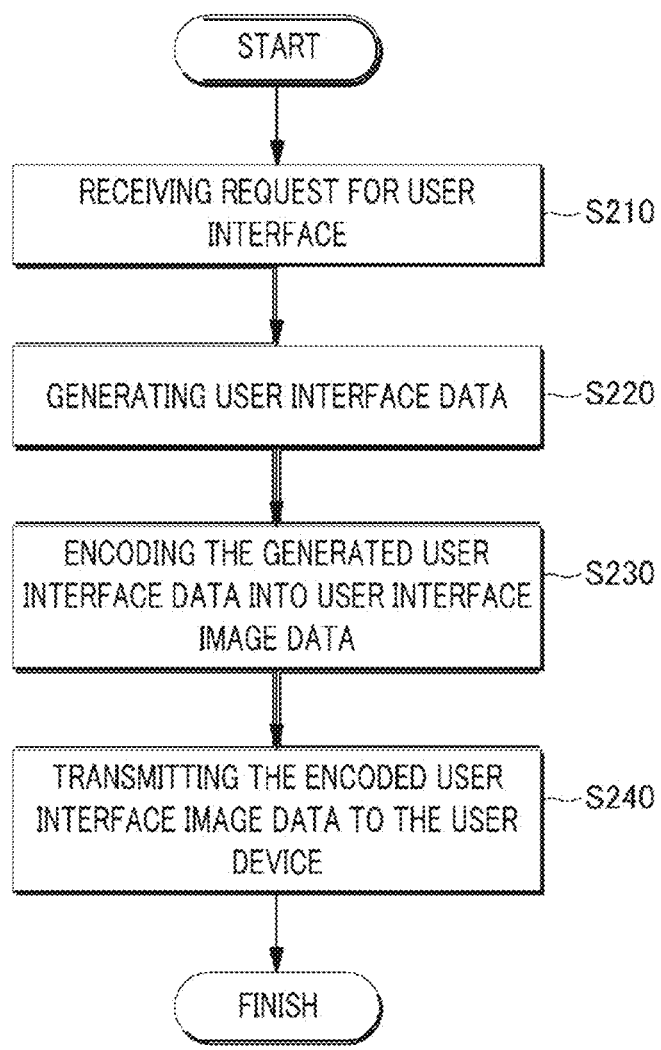
FIG. 3 is a flow diagram illustrating a user interface providing service according to an exemplary embodiment.

FIG. 3 is a flow diagram illustrating a user interface providing service according to an exemplary embodiment.

In operation S210, the cloud service providing server 200 receives a request for user interface from the user device 100. The user device 100 may request for user interface enabling selection of an application prior to requesting for execution of an application. The cloud service providing server 200 may receive information of the user device together with the request for user interface.

In operation S220, the cloud service providing server 200 searches user settings matched with the user device 100 by using the received information of the user device 100 and generates user interface data that is available to the user device 100. Forms of the user interface, e.g., types of icons for selection of an application, arrangement thereof, and others may be set by the user. User setting information of the user interface may be stored in the cloud service providing server 200 while being matched with the user device.

Accordingly, the cloud service providing server 200 may search and acquire the user setting information including the information of the user interface matched with the information of the user device from a database.

In operation S230, the cloud service providing server 200 encodes the generated user interface data into user interface image data.

In operation S240, the cloud service providing server 200 transmits the encoded user interface image data to the user device 100. The user device 100 displays the received user interface image data to a screen so as to provide the user interface to the user. The user may select his/her desired application by using the provided user interface to request execution of the application.

Figure 5:
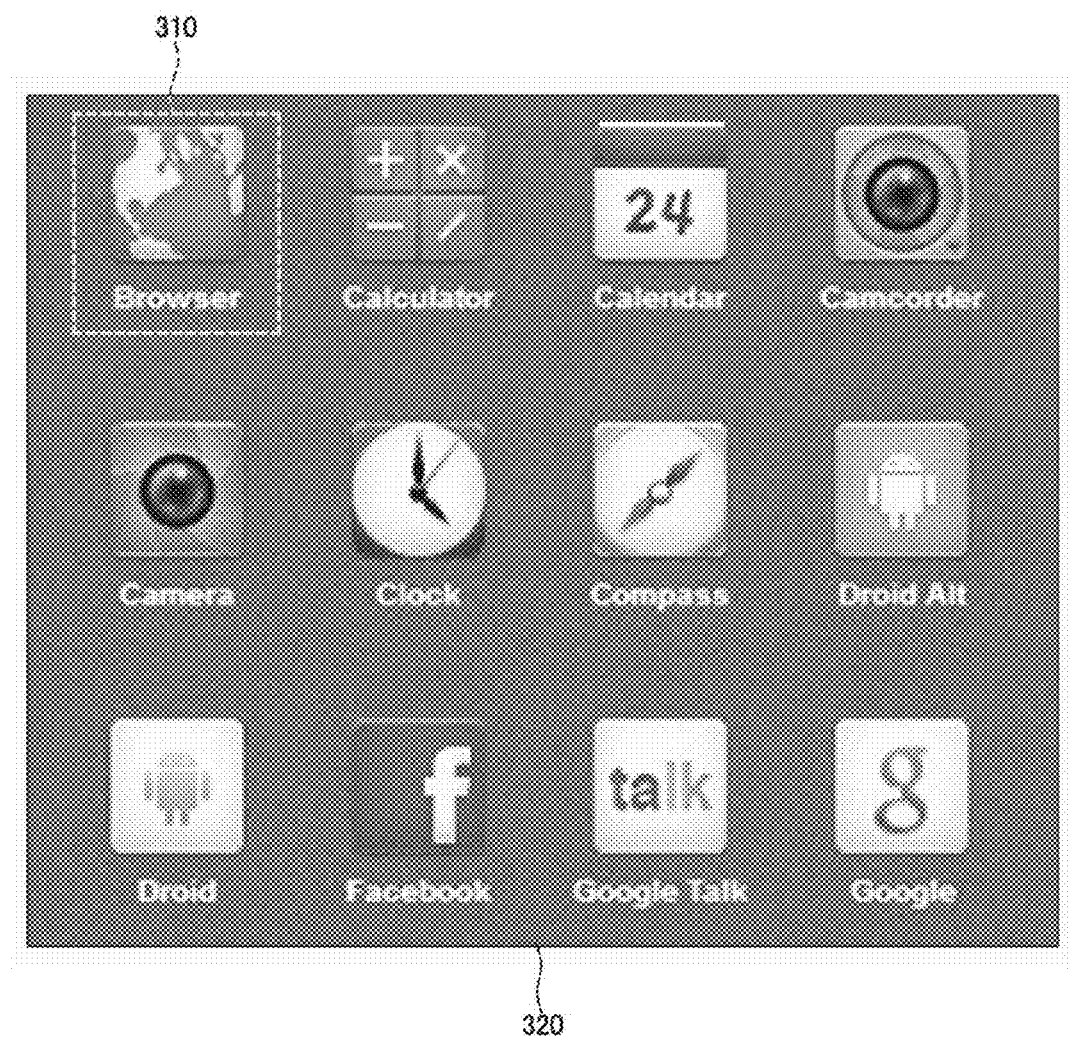
FIG. 5 is a display illustrating the user interface according to an exemplary embodiment.

An example for the user interface provided to the user device 100 is illustrated in FIG. 5.

Figure 4:
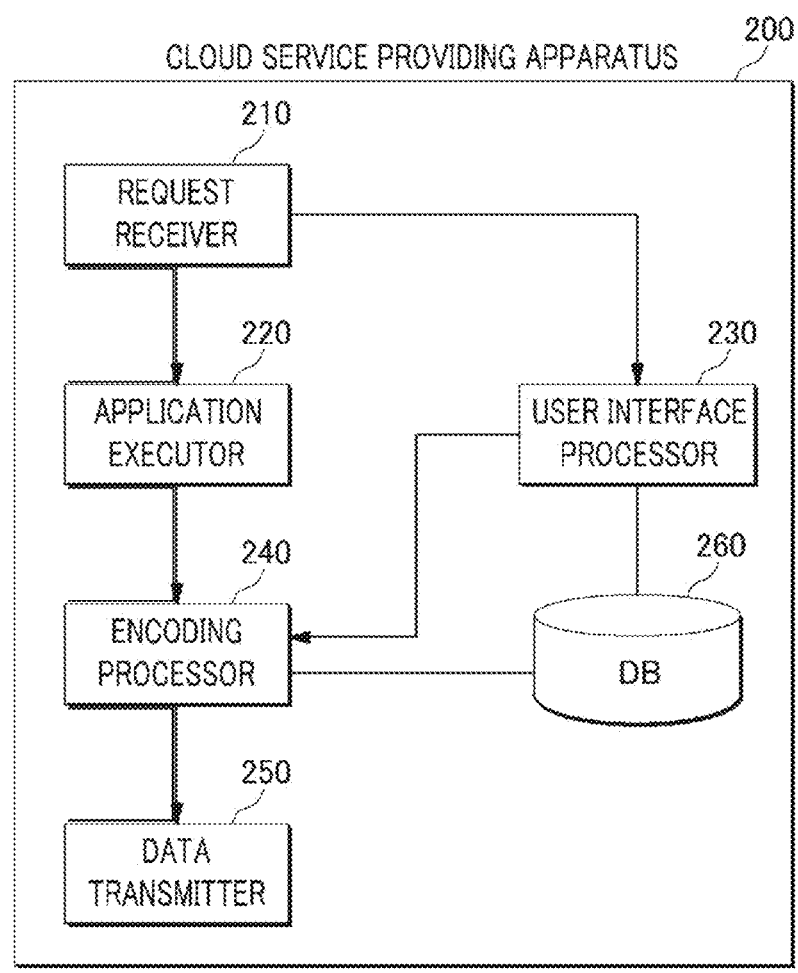
FIG. 4 is a block diagram illustrating a cloud service providing server according to an exemplary embodiment.

FIG. 4 is a block diagram illustrating a cloud service providing server according to an exemplary embodiment.

The cloud service providing server 200 according to an exemplary embodiment includes a request receiver 210, an application executor 220, a user interface processor 230, an encoding processor 240, a data transmitter 250, and a database 260.

The request receiver 210 receives a request for execution of an application or a request for providing user interface from the user device 100. The request receiver 210 may receive identification information of the user device 100 together with the request for execution of an application or the request for providing user interface.

In response to the request for execution of an application received by the request receiver 210, the application executor 220 executes the application requested by the user device 100 to generate application execution data. As aforementioned, the requested application may be executed by the virtual machine generated by the cloud service providing server 200.

In response to the request for user interface received by the request receiver 210, the user interface processor 230 generates the requested user interface.

The user interface processor 230 acquires user interface setting information of the user device 100 from the database 260 by using the identification information of the user device 100 received together with the request for user interface. The user interface processor 230 may generate the user interface data that is available to the user device by using the acquired user interface setting information, and encode the generated user interface data into user interface image data.

The encoding processor 240 generates image data by encoding the application execution data or the user interface data.

The encoding processor 240 may acquire a hardware specification of the user device 100, e.g., a processing speed of a central processing unit (CPU), a memory size, and resolution available for processing, etc., from the database 260, and generate the image data available to the user device 100 by using the acquired hardware specification of the user device 100.

The encoding processor 240 determines whether the video data is included in the application execution data. If the video data is included in the application execution data, the encoding processor 240 determines whether the user device can reproduce the video. The encoding processor 240 can determine whether the video data is reproducible by the user device 100, by using the hardware specification of the user device 100 acquired from the database 260.

If the user device 100 can reproduce the video, the encoding processor 240 may encode only the remaining execution screen, other than the area where the video is reproduced, in the execution screen of the application, into image data.

If the remaining execution screen, other than the area where the video is reproduced, in the execution screen of the application is encoded into image data, the encoding processor 240 may acquire position information of the area where the video is reproduced, within the screen.

The data transmitter 250 transmits the application execution image data or the user interface image data that have been generated by the encoded processor 240, to the user device 100.

If the remaining execution screen, other than the area where the video is reproduced, in the execution screen of the application is encoded into image data, the data transmitter 250 may transmit, to the user device 100, the video data included in the application execution data, and the position information of the area where the video is reproduced within the screen, in addition to the image data for the execution screen of the application.

FIG. 5 is a display illustrating the user interface according to an exemplary embodiment.

According to an exemplary embodiment, the user device 100 may be provided with image data including an icon 310 indicating an application that can be provided to the user device 100, as illustrated in FIG. 5. The user may request execution of an application desired to be executed, to the cloud service providing server 200 by receiving a user input on the user interface displayed through the user device 100.

Exemplary embodiments of the present disclosure can be embodied in a storage medium including instruction codes executable by a computer such as a program module executed by the computer. Besides, the data structure according to the exemplary embodiments of the present disclosure can be stored in the storage medium executable by the computer. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the exemplary embodiments. It shall be understood that all modifications and embodiments conceived from the meaning and scope of the claims and their equivalents are included in the scope of the present disclosure.

What is claimed is:

1. A method performed by a service providing apparatus, the method comprising:
receiving a request for execution of an application from a device;
acquiring a hardware specification of the device from a database of the service providing apparatus, wherein the hardware specification of the device comprises a processing speed of the device;
executing the application in response to the request;
encoding application execution data generated by the execution of the application into image data, wherein the image data is generated partly based on the processing speed of the device; and
transmitting encoded image data to the device,
wherein the encoded image data is configured to be displayed on a screen of the device,
wherein the executing the application comprises: in response to the request for execution of the application, generating a virtual machine and the generated virtual machine performing the execution of the application, wherein the encoding the application execution data comprises:
  determining whether or not video data is included in the application execution data to generate a determination result;
  selecting target data based on the determination result; and
  encoding the target data into the image data,
wherein the selecting the target data comprises:
  upon a condition that the determination result indicates that the video data is included in the application execution data, determining whether or not the video data is reproducible by the device, and
  upon a condition that the video data is reproducible by the device, the target data is selected such that only a remaining area of an execution screen of the application, other than an area where the video data is included, is encoded into the image data.

2. The method of claim 1, further comprising:
transmitting the video data and position information of the video data that is to be reproduced on the screen of the user device.

3. The method of claim 1, further comprising:
receiving a request for a user interface from the device;
generating user interface data that is available to the device;
encoding the generated user interface data into user interface image data; and
transmitting encoded user interface image data to the user device.

4. The method of claim 3, wherein the encoded user interface image data is configured to be displayed on a screen of the device.

5. The method of claim 4, wherein the encoded user interface image data includes at least one icon showing at least one application that is available to the device.

6. A service providing apparatus comprising:
a request receiver which receives a request for execution of an application from a device;
an application execution processor which executes the application in response to the request for execution of the application to generate application execution data;
a database which stores identification information and a hardware specification of the device, wherein the hardware specification of the device comprises a processing speed of the device;
a computer storage hardware comprising an encoding processor which encodes the generated application execution data into image data, wherein the image data is generated partly based on the processing speed of the device; and
a data transmitter which transmits encoded image data to the device,
wherein the encoded image data is configured to be displayed on a screen of the device, and wherein the executing the application comprises: in response to the request for execution of the application, generating a virtual machine and the generated virtual machine performing the execution of the application,
wherein the encoding the generated application execution data by the encoding processor comprises:
  determining whether or not video data is included in the generated application execution data to generate a determination result;
  selecting target data based on the determination result; and
  encoding the target data into the image data, wherein the selecting the target data comprises:
  upon a condition that the determination result indicates that the video data is included in the generated application execution data, determining whether or not the video data is reproducible by the device, and
wherein upon a condition that the video data is reproducible by the device, the target data is selected such that only a remaining area of an execution screen of the application, other than an area where the video data is included, is encoded into the image data.

7. The apparatus of claim 6, further comprising:
a user interface processor configured to generate user interface data that is available to the device if the request receiver receives a request for a user interface from the device, and to encode the generated user interface data into user interface image data,
wherein the data transmitter transmits the encoded user interface image data to the device.

8. The method of claim 1, wherein the service providing apparatus provides a cloud service.

9. The apparatus of claim 6, wherein the service providing apparatus provides a cloud service.

10. The method of claim 1, wherein the executing the application is performed by the service providing apparatus, not the device.

11. The method according to claim 1, wherein the receiving a request for execution of the application comprises receiving, by the device, an input of a user based on a point on the screen being selected by the user and receiving, by the service providing apparatus, a coordinate corresponding to the selected point.

12. The apparatus of claim 6, wherein the receiving of the request for execution of the application comprises receiving, by the device, an input of a user based on a point on the screen being selected by the user and receiving, at the request receiver, a coordinate corresponding to the selected point.

13. The method of claim 1, wherein if the video data is not reproducible by the device, the video data is converted into images and included in the target data.

14. The apparatus of claim 6, wherein the image data comprises encoded target data including video data converted into images.

* * * * *